Sept. 12, 1950     J. E. KENNEDY     2,521,731
SELF-ALIGNING BEARING

Filed Dec. 26, 1947     4 Sheets-Sheet 1

INVENTOR.
J. E. Kennedy
BY John A. Seifert
ATTORNEY.

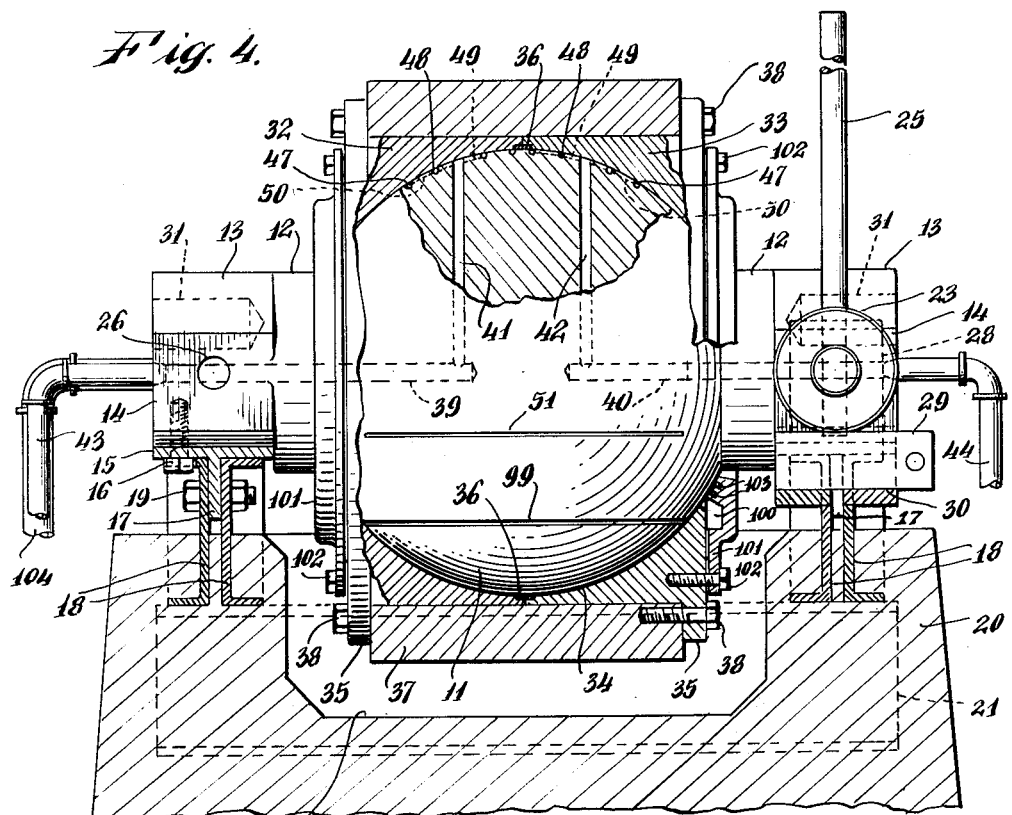

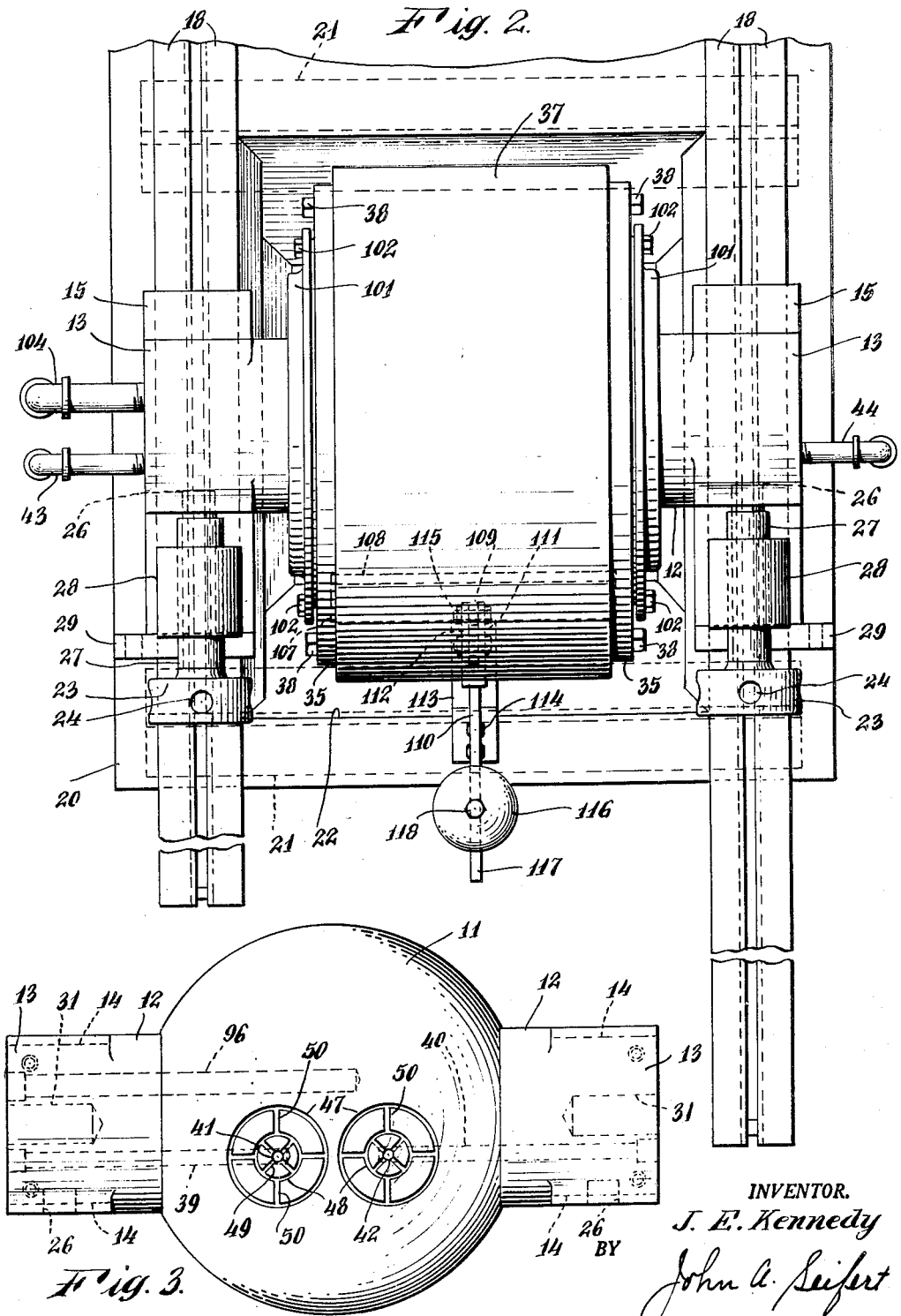

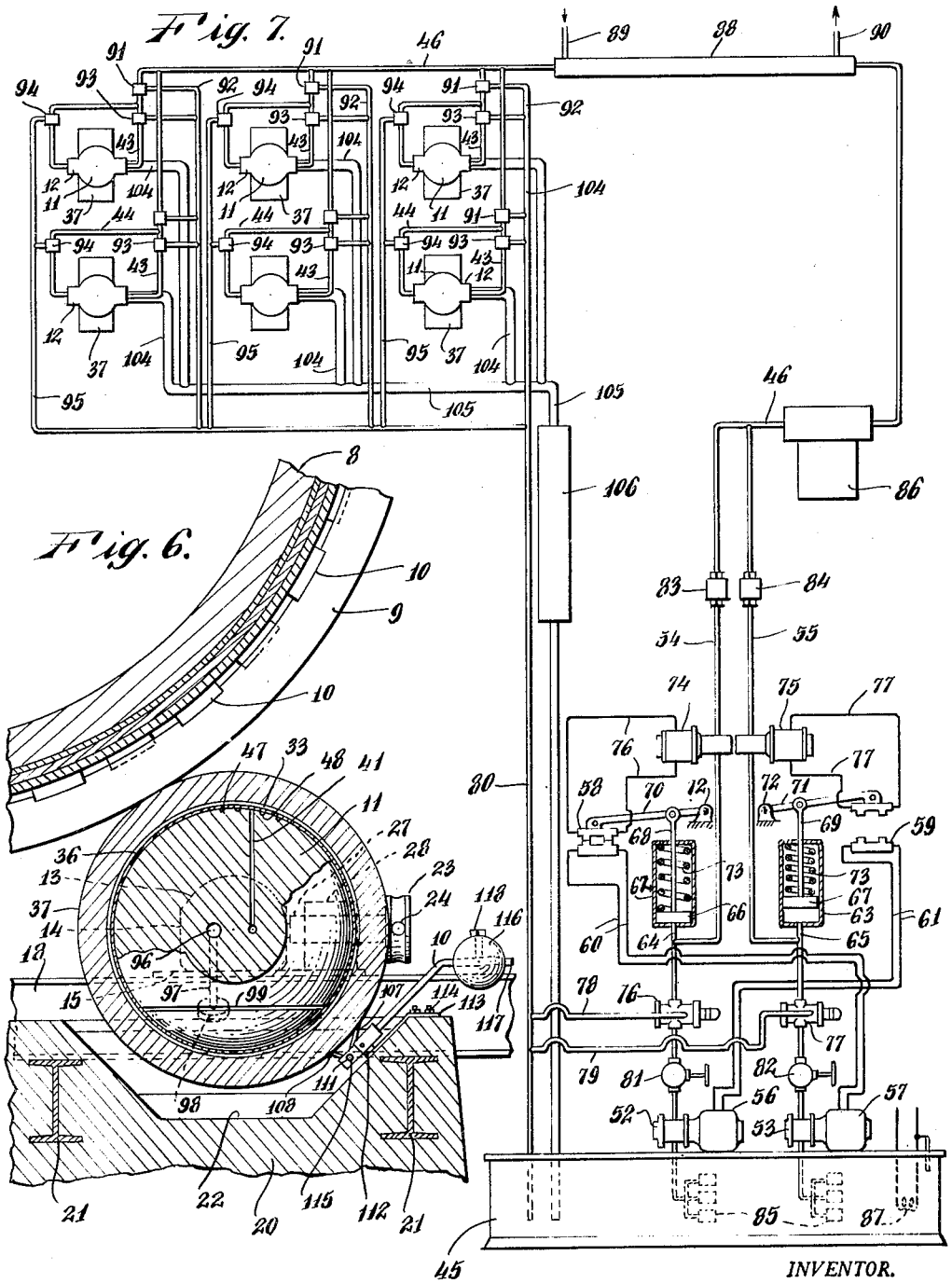

Patented Sept. 12, 1950

2,521,731

UNITED STATES PATENT OFFICE 2,521,731

SELF-ALIGNING BEARING

Joseph E. Kennedy, New York, N. Y.

Application December 26, 1947, Serial No. 794,002

6 Claims. (Cl. 308—121)

This invention relates to self-alining bearings particularly adapted for supporting cylindrical rotary apparatus, such as kilns, screens, tube mills and the like.

It has been the practice to rotatably support cylindrical apparatus, such as rotary kilns, screens, tube mills and the like, by a series of pairs of rollers engaging riding rings mounted on the cylindrical apparatus in longitudinal spaced relation to each other. Due to the length of the cylindrical apparatus, the rollers and riding rings are easily forced out of vertical and horizontal alinement with each other resulting in undue wear of either or both the rollers and riding rings, which necessitates replacement of the rollers and riding rings.

It is an object of the invention to overcome this disadvantage of the present type of rollers by providing a self-alining bearing arranged with a bearing ring to engage the riding rings of the cylindrical apparatus and adapted to be maintained in vertical alinement with the riding rings by the lateral shifting or tilting movement of the bearing caused by the shifting of the weight of the cylindrical apparatus.

In the operation of kilns, it is the practice to have the kiln incline from one end to the opposite end and this inclination is accomplished by adjusting the supporting rollers. A great amount of time and experience are required to adjust the rollers to have the kiln incline at the proper angle.

It is another object of the invention to reduce the amount of time required to adjust the inclination of a kiln by providing self-alining bearings or rollers.

It is another object of the invention to provide a self-alining bearing comprising a shaft having a spherical portion and a bearing member having a bearing surface corresponding to the curvature of the spherical portion and engaged on the spherical portion whereby the shaft and bearing member have rotary and tilting movements relative to each other.

Another object of the invention is to provide the shaft with ducts terminating in the periphery of the spherical portion and connected in communication with a source of supply of lubricant to lubricate under pressure the contacting or bearing surfaces of the spherical portion of the shaft and the bearing member.

It is a further object of the invention to provide the bearing member in two sections to facilitate mounting of the bearing member on the spherical portion of the shaft and unite said sections by a bearing ring forming part of the bearing member to engage a riding ring of the cylindrical apparatus.

A further object of the invention is to provide the bearing member with lubricant collecting chambers at the opposite sides adapted to communicate with and deliver excess lubricant to a return duct of the lubricant ducts in the shaft of the bearing.

Other objects and advantages of the invention will appear in the detailed description of the invention.

In the drawings accompanying and forming a part of this application, Figure 1 is an end elevational view of a rotary kiln supported by a pair of the self-alining bearings forming the embodiment of this invention.

Figure 2 is a plan view of a bearing.

Figure 3 is a plan view of a shaft forming part of the bearing.

Figure 4 is an elevational view of the bearing looking at the bottom of Figure 2 with portions of the shaft, bearing member, bearing ring and supporting structure in section to show the structure and relation of said parts and a pair of ducts for delivering lubricant to the contacting surfaces of the spherical portion of the shaft and the bearing member.

Figure 5 is a view similar to Figure 4 with the supporting structure removed and showing a lubricant return duct in communication with a lubricant collecting chamber in lubricant retaining rings of the bearing member.

Figure 6 is a fragmentary view of a bearing in section supporting a kiln and showing a scraper relative to a portion of the bearing ring traveling through a water and oil trough.

Figure 7 is a diagrammatic view of a series of pairs of bearings connected in communication with a circulating lubricating system.

Figure 1:
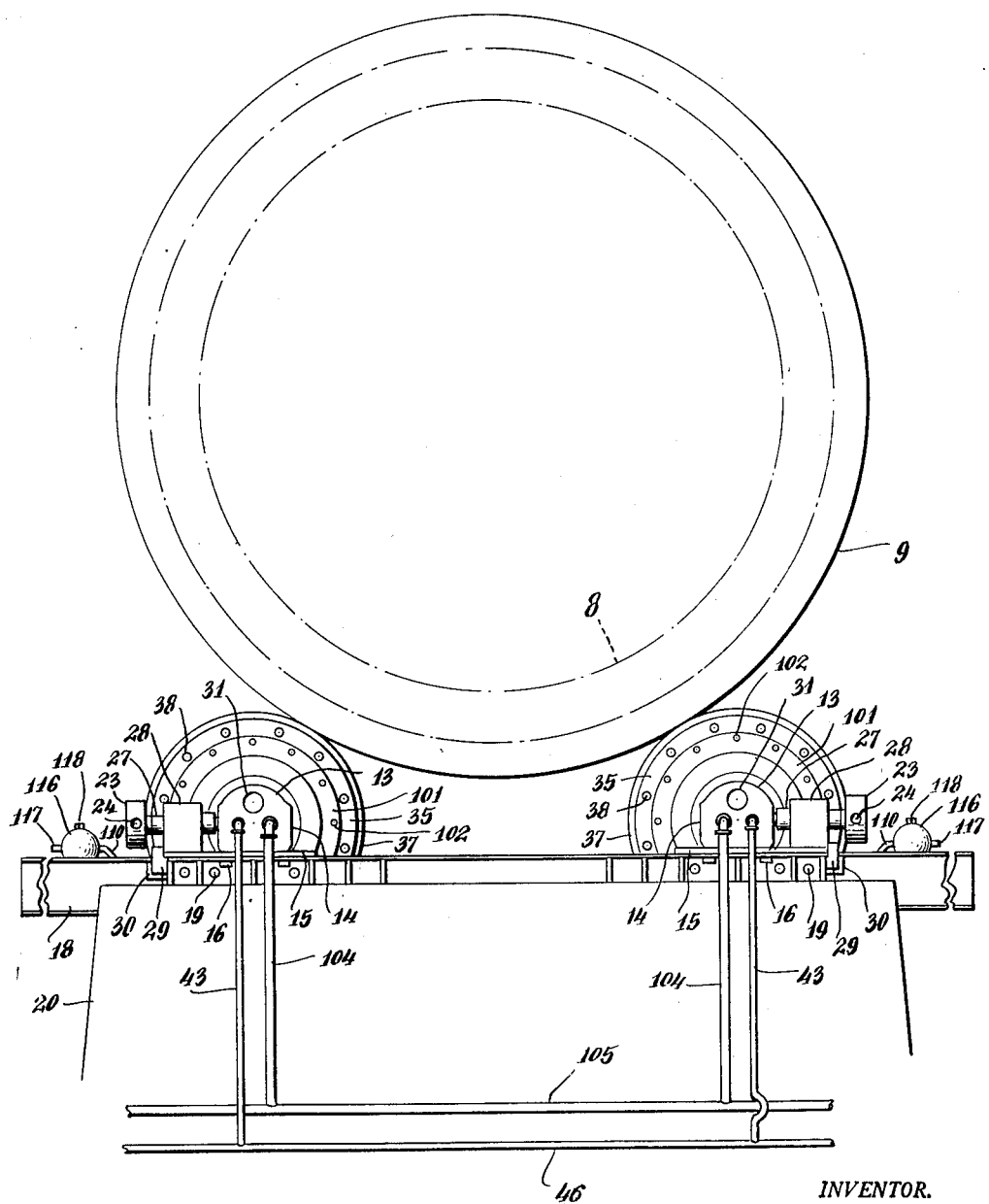

The embodiment of the invention is shown in conjunction with a rotary kiln 8 having a series of riding rings 9 spaced longitudinally of the kiln and secured to the kiln by retaining blocks 10, as shown in Figure 6.

The kiln is rotatably supported at the riding rings 9 thereof by a pair of bearings or rollers engaging each riding ring at opposite sides of the longitudinal axis of the kiln. Each of said bearings or rollers comprises a shaft having a spherically shaped center portion 11, circular portions 12 at the opposite sides of the spherical portion, and end portions arranged with a curved upper surface 13 and side and bottom straight or flat surfaces 14 extending at right angles to each other. The shaft is supported at the end portions 13, 14 to extend parallelly of and at one side of the longitudinal axis of the kiln 8 by engaging and securing the bottom straight surfaces 14 on base plates 15 by bolts 16. Vertical tongues 17 depending from the base plates 15 are engaged between and secured to two parallel beams 18 as by bolts 19. The beams 18 are partially embedded in a foundation 20 and supported by transverse I beams 21 embedded in the foundation on opposite sides of an oil and water trough 22 in the foundation, as shown in Figures 4 and 6. To take-up lateral thrust of the kiln and prevent the shaft from being moved laterally on the base plates 15 by the weight of the kiln, each end portion 13, 14 of the shaft is provided with an adjusting screw having a head 23 at one end arranged with openings 24 extending transversely therethrough for the engagement therein of an adjusting bar 25, as shown in Figure 4. The opposite end of the screw engages a recess 26 in one of the side flat faces of the opposite end portions of the shaft, as shown in Figure 2. The adjusting screw is adjustably mounted in a sleeve 27 secured in a thrust block 28 mounted on an end portion of the base plate 15.

This lateral thrust is also taken-up by a thrust key 29 engaged in a recess 30 in the beams 18 to abut the end edge of the base plate 15 and the thrust block 28, as shown in Figures 1, 2 and 4.

To facilitate handling of the bearing when completely assembled, the end portions of the shaft are provided with hoisting bar engaging holes 31, as shown in Figures 1 and 4.

A bearing member is mounted on the spherical portion 11 of the shaft to turn freely thereon and to facilitate mounting of said member on the spherical portion, it is arranged in two corresponding sections 32 and 33 of annular shape having the inner peripheral surface of transverse arcuate form corresponding to the curvature of the spherical portion 11, as shown at 34. The outer peripheral surface of the two sections in mated position is arranged of channel shape in cross section by an annular flange 35 at the outer side of each section. The mating edges of the sections 32 and 33 are arranged with corresponding recesses for the engagement of a sealing member 36 to provide a lubricant seal at said mating edges. The bearing member sections 32 and 33 are retained on the spherical portion 11 in mating position by a bearing ring 37 engaged in the peripheral channel formed by the flanges 35 and secured to said flanges by bolts 38 engaged in the flanges and screw threaded in the bearing ring 37 with the outer peripheral portion of the bearing ring extending beyond the flanges to engage and support the riding ring 9 of the kiln, as shown in Figures 1, 2, 4 and 5. The bearing member is mounted on the spherical portion 11 of the shaft before the shaft is mounted on the base plates 15.

To provide free rotary movement of the bearing member about the axis of the shaft and tilting movements of the bearing member toward and away from said axis, the bearing surface 34 of the bearing member and the periphery of the spherical portion of the shaft are lubricated by a suitable lubricant, such as mineral oil. The lubricant is supplied to said surface by a pair of ducts or bores 39 and 40 extending through the opposite end portions of the shaft toward and terminating at one side of the vertical center of the shaft and having vertical extensions 41 and 42, respectively, extending in parallel spaced relation on opposite sides of the vertical center to the periphery of the spherical portion 11. The ducts 39 and 40 extend parallelly of and at one side of the longitudinal axis of the shaft and are connected in communication with pipes 43 and 44, respectively, connected in communication with a source of supply of lubricant, such as an oil reservoir 45 through a supply conduit 46, as shown in Figures 4 and 7. To assure an even distribution of the lubricant over the upper portion of the periphery of the spherical portion 11 of the shaft and the bearing surface 34 of the bearing member sections 32 and 33, there are provided annular grooves 47 and 48 concentric of each other and the outlets of the vertical extensions 41 and 42. The inner annular grooves 48 are connected to said outlets by a series of grooves 49 extending radially from the outlets to said inner annular grooves and forming communications between said outlets and inner annular grooves, as shown in Figures 3, 4 and 6. The annular grooves 47 and 48 are connected in communication with each other by a series of grooves 50 extending radially of said annular grooves, so that the lubricant will flow from the vertical extensions 41 and 42 through the radial grooves 49 to the annular grooves 48 and through the radial grooves 50 to the annular grooves 47. The lubricant will fill and overflow said grooves 47—50 and by the rotation of the bearing member sections 32 and 33 will be distributed over the periphery of the spherical portion 11 and the bearing surface 34 of said bearing member sections. The lubricant is further distributed over the spherical portion 11 and bearing surface 34 by grooves 51 in the spherical portion 11 extending in the same plane parallelly of the axis of the shaft and spaced from each other.

The lubricant is delivered under pressure from the reservoir 45 to the ducts 39, 40 vertical extensions 41, 42 and grooves 47—50 by one of a plurality of pumps indicated in a general way as a pair of pumps 52 and 53 connected in communication with the conduit 46 and reservoir 45 through pipes 54 and 55, respectively, and actuated by electric motors 56 and 57, respectively, as shown in Figure 7. Automatic control mechanism is interposed in the section of the pipes 54 and 55 between the pumps 52 and 53 and conduit 46 to close the communication between pump 52 and conduit 46 and open the circuit of the motor 56 while maintaining communication between pump 53 and conduit 46 and the motor 57 energized, and conversely shut off the motor 57 and the communication between the pump 53 and conduit 46, and energize motor 56 and open communication between pump 52 and conduit 46 should pump 53 become inoperative.

Said control mechanism comprises electric switches 58 and 59 connected in the electric circuits of the motors 57 and 56 through conductors 60 and 61, respectively. The movable contact of each switch is normally actuated by spring pressure to circuit closing position and actuated to circuit opening position by the pressure in the pipe line of the pump actuated by the motor in the circuit of the other switch. This is accomplished by closed end cylinders 62 and 63 having one end connected in communication with the pipes 54 and 55 through branch pipe connections 64 and 65, respectively. Pistons 66 and 67 are slidably mounted in the cylinders 62 and 63, respectively, and have rods 68 and 69 extending from the ends of the cylinders 62 and 63 opposite the ends connected to the branch pipes 64 and 65, respectively. The piston rods 68 and 69 are pivotally connected to an intermediate portion of arms 70 and 71 having one end pivotally mounted on a fixed support, as shown at 72 in Figure 7, and the opposite ends of said arms adapted to carry the movable contacts of the switches 58 and 59, respectively. The pistons 66 and 67 are yieldingly urged toward the ends of the cylinders 62 and 63 connected to the branch pipes 64 and 65 by springs 73 in said cylinders compressed between the opposite end of the cylinders and the pistons, whereby the switches 58 and 59 are normally maintained in circuit closing position. As shown in Figure 7, the pump 53 is forcing lubricant from the reservoir 45 through the pipe 55 and the conduit 46 to the bearings, for the reason the circuit of the motor 57 is closed by switch 58. The pressure in the pipe 55 forces the piston 67 into the cylinder 63 against the spring 73 in said cylinder 63 and actuates the switch 59 to open the circuit of motor 52 and thereby stopping the operation of the pump 52. Should the pump 53 fail for any reason, such as clogging or failure in the motor 57, the pressure in the cylinder 63 will drop thereby permitting the piston 67 to assume its normal lowermost position under the influence of the spring 73 in said cylinder 63 and actuating the switch 59 to close the circuit of the motor 56 and place the pump 52 in operation to force lubricant from the reservoir 45 through pipe 54 and conduit 46 to the bearings. The operation of the pump 52 forces piston 66 into the cylinder 62 against the force of the spring 73 in said cylinder and actuates the switch 58 to open the electric circuit of the motor 57 and stop the operation of the pump 53 to permit repair of said pump or motor.

To assure a positive stoppage of the flow in the pipe of the inoperative pump, there are provided solenoid operated valves 74 and 75 interposed in the pipes 54 and 55, respectively, and having the coil of the solenoid connected in the circuit of the switches 58 and 59 and the motors 57 and 56 through conductors 76 and 77, respectively. The energization of the solenoids actuate the valves to close the pipes 54 and 55 and the valves are actuated by a spring to open position when the solenoids are de-energized, so that in the positions shown in Figure 7, the valve 75 is in open position and the valve 74 is in close position, whereby the pump 53 forces lubricant through the pipe 55 and the pipe 54 is closed.

To prevent excessive pressures in the pipes 54 and 55 and the conduit 46, pressure regulating valves 76 and 77 are interposed in the pipes 54 and 55 between the pumps 52, 53 and cylinders 62, 63 and having excessive pressure outlets or drains connected through pipes 78 and 79 to a vent pipe 80 having an outlet terminating in the reservoir 45 whereby excessive lubricant is returned to the reservoir.

The pumps 52 and 53 are manually shut-off from the supply conduit 46 by manually actuated valves 81 and 82 interposed in the pipes 54 and 55 between the pumps and the pressure regulating valves 76 and 77.

To prevent a back flow of lubricant, there are provided check valves 83 and 84 in the pipes 54 and 55 between the solenoid actuated valves 74 and 75 and the supply conduit 46.

To assure a supply of clean lubricant to the bearings, there are provided filters 85 at the inlet ends of the pipes 54 and 55 in the reservoir and a filter 86 in the conduit 46 adjacent to the pipes 54 and 55.

When the flow of oil is reduced by a low atmospheric temperature, the lubricant may be rendered more fluid by an electric heating element in the reservoir, as indicated in a general way at 87 in Figure 7. To provide a supply of lubricant at a low temperature to the bearings, the lubricant is cooled prior to its delivery to the pipes 43 and 44 by providing a cooling jacket 88 encircling the portion of the conduit 46 adjacent to the pipes 43 and 44 and connected to a source of supply of cooling medium, such as water, through inlet pipe 89 and outlet pipe 90 connected in communication to the opposite ends of the jacket 87, whereby there is a constant circulation of the cooling medium through the jacket. The jacket 88 may be used as a heating element in place of the electric heating element 87 by circulating a heating medium, such as hot water or steam, through the jacket 88.

The pressure and flow of the lubricant to the bearings are further controlled by pressure reducing valves 91 interposed in the connections between the pipes 43, 44 and supply conduit 46 and having excessive pressure or lubricant outlets connected by pipes 92 to the vent pipe 80, whereby the excessive lubricant is returned to the reservoir. Flow regulating valves 93 and 94 are interposed in the pipes 43 and 44 with valves 93 having excessive pressure or lubricant outlets connected to the pipes 92 to return said pressure or lubricant to the reservoir 45 through the vent pipe 80. The valves 94 have excessive pressure or lubricant outlets connected to the vent pipe 80 through pipes 95.

The excess lubricant in the bearing is returned to the reservoir 45 through a duct or bore 96 extending through one end 12—14 of the shaft in parallel spaced relation to the duct 39 and on the side of the axis of the shaft opposite the side on which the duct 39 is positioned, as shown in Figures 3 and 5, and the inner end of the duct 96 terminating beyond the vertical or transverse center of the shaft and arranged with two diverging extensions 97 terminating in recesses 98 in the periphery of the spherical portion constituting enlarged inlets for the lubricant return duct 96. The lubricant is collected at the lower section of the spherical portion 11 by a circumferential groove 99, Figure 4, in said spherical portion intersecting the recesses 98, as shown in Figure 6. The excess lubricant is also directed to the recesses 98 by a lubricant collecting chamber 100 in an annular member or ring 101 mounted on the outer free side of each of the bearing member sections 32 and 33 by bolts 102 engaged in a flat portion of the ring 101 at the outer side of the chamber 100, as shown in Figures 4 and 5. The inner face of the rings 101 adjacent to the inner periphery thereof is arranged with a series of grooves 103 with the edges of the walls of the grooves engaging the spherical portion 11 above the recesses 98 and the groove 99 to form a seal and retain the lubricant on said spherical portion within the area engaged by the bearing member sections 32 and 33. The pressure of the lubricant being fed through the ducts 39, 40, vertical extensions 41, 42, pipes 43, 44, conduit 46 and pipe 54 or 55 will force the excess lubricant through the diverging extensions 97 and duct 96 to the reservoir 45 through a pipe 104 connected at one end in communication with the duct 96 and the opposite end of the pipe 104 connected in communication with a lubricant return conduit 105 having its outlet end terminating in the reservoir 45, as shown in Figure 7. To prevent depositing of foreign matter in the reservoir, the conduit 105 is provided with an elongated filter, as shown in a general way at 106 in Figure 7, of a capacity to assure the complete removal of all the foreign matter from the lubricant.

In Figure 7, there is illustrated a series of pairs of bearings representing the bearings supporting a kiln to show the connections of said bearings in the described lubricating system.

To maintain the riding rings 9 of the kiln 8 and the bearing rings 37 of the bearings in clean condition, the peripheral portion of the bearings travel through an oil and water bath in the trough 22 in the foundation 20 below each bearing. To prevent adhesion of foreign matter on the bearing rings 37 and transference of said matter to the riding rings 9, said foreign matter is removed from each ring 37 by a scraper 107 of angle or V shape in cross section having one longitudinal edge flanged, as at 108, and a boss 109 on the exterior face of the angle thereof. The scraper is pivotally mounted on a side wall of the trough 22 by a lever 110 having a bifurcated member 111 at one end pivotally supported on an ear portion 112 extending between the bifurcation legs of the bifurcated member from a plate 113 secured to the foundation, as at 114 in Figures 2 and 6. The scraper 107 is pivotally mounted on the bifurcated member 111 by pivotally connecting the boss 109 between the bifurcation legs of the bifurcated member, as at 115. The straight edge and flanged edge 108 of the scraper 107 are maintained in engagement with the bearing ring 37 by a weight 116 adjustably mounted on a horizontal end portion 117 of the lever 110 and retained in adjusted position by a screw 118.

Having thus described my invention, I claim:

1. In a self-alining bearing, a shaft having a spherical portion intermediate the ends thereof and ducts extending through the end portions to the periphery of the spherical portion of the shaft, a source of supply of lubricant connected to certain of said ducts to deliver lubricant to the periphery of the spherical portion, and a bearing member having a bearing surface corresponding to the curvature of the spherical portion of the shaft and mounted on said spherical portion whereby the shaft and bearing member have rotary and tilting movements relative to each other with a film of lubricant between the spherical portion and bearing member.

2. In a self-alining bearing as claimed in claim 1, a series of annular grooves in said periphery of the spherical portion concentric to the lubricant delivery end of each duct of the ducts connected to the source of supply of lubricant and said annular grooves connected in communication with each other and said delivery ends to distribute the lubricant to the bearing surfaces between the spherical portion of the shaft and the bearing member.

3. In a self-alining bearing as claimed in claim 2, an annular member secured to each side of the bearing member and having lubricant sealing engagement with the spherical portion of the shaft and a lubricant collecting chamber therein.

4. A self-alining bearing as claimed in claim 3, wherein a duct of the ducts in the shaft is arranged with inlet portions having enlarged inlet ends in the periphery of the spherical portion to communicate with and receive lubricant from the lubricant collecting chamber in the annular members.

5. In a self-alining bearing as claimed in claim 4, a circumferential groove in the spherical portion intersecting the enlarged inlet ends of the inlet portions of the duct to collect and deliver lubricant to said enlarged inlet ends.

6. In a self-alining bearing as claimed in claim 5, spaced grooves in the spherical portion extending in the same plane parallel to the axis of the shaft and between the annular and circumferential grooves to distribute the lubricant over the spherical portion and the bearing surface of the bearing member.

JOSEPH E. KENNEDY.

REFERENCES CITED

The following references are of record in the file of this patent:

UNITED STATES PATENTS

| Number | Name | Date |
| --- | --- | --- |
| 554,451 | Miller | Feb. 11, 1896 |
| 1,622,136 | Dworack | Mar. 22, 1927 |
| 1,806,545 | Ludwick | May 19, 1931 |
| 1,908,269 | Polmgren | May 9, 1933 |
| 2,155,218 | Cain | Apr. 18, 1939 |
| 2,272,118 | Inse | Feb. 3, 1942 |
| 2,380,150 | Collito | July 10, 1945 |